United States Patent [19]
Derrien et al.

[11] Patent Number: 5,478,030
[45] Date of Patent: Dec. 26, 1995

[54] LATERALLY-RAISABLE AIRCRAFT LANDING GEAR

[75] Inventors: Michel Derrien, Versailles; Dominique Chauvet, Chatillon, both of France

[73] Assignee: Messier-Eram, Velizy Villacoublay, France

[21] Appl. No.: 266,643

[22] Filed: Jun. 28, 1994

[30] Foreign Application Priority Data

Jul. 15, 1993 [FR] France ................... 93 08686

[51] Int. Cl.⁶ .................................. B64C 25/12
[52] U.S. Cl. ...................................... 244/102 R
[58] Field of Search .................. 244/100 R, 102 R, 244/102 A, 102 ST, 104 R, 104 FP

[56] References Cited

U.S. PATENT DOCUMENTS

| | | | |
|---|---|---|---|
| 2,974,909 | 3/1961 | Perdue | 244/102 R |
| 4,199,119 | 4/1980 | Masclef | 244/104 FP |
| 4,422,602 | 12/1983 | Turiof | 244/102 R |

FOREIGN PATENT DOCUMENTS

| | | | |
|---|---|---|---|
| 0031601 | 12/1980 | European Pat. Off. | |
| 1245515 | 6/1957 | France | |
| 844741 | 4/1959 | United Kingdom | 244/102 R |
| 1112791 | 5/1968 | United Kingdom | 244/102 R |
| 1441885 | 7/1976 | United Kingdom | 244/102 R |

*Primary Examiner*—Galen L. Barefoot
*Attorney, Agent, or Firm*—Sixbey, Friedman, Leedom & Ferguson; Gerald J. Ferguson, Jr.; Tim L. Bracket, Jr.

[57] ABSTRACT

The invention relates to aircraft landing gear of the type that is laterally-raisable and that has twin wheels in a side-by-side configuration. According to the invention, the leg is constituted by an upside-down L-shaped strut whose two branches are hinged together, comprising a beam-forming first branch that is hinged to the structure of the aircraft and a second branch having a wheel lever hinged to the end thereof. The wheel lever is also connected to the first branch via a shock absorber. A controlling guide bar connects the second branch to the structure of the aircraft via a fork swivel-mounted on said second branch, in such a manner as to cause said second branch to move forwards while the landing ger is being raised, such forwards movement causing the wheels to be folded in because the shock absorber then acts as a second guide bar.

7 Claims, 6 Drawing Sheets

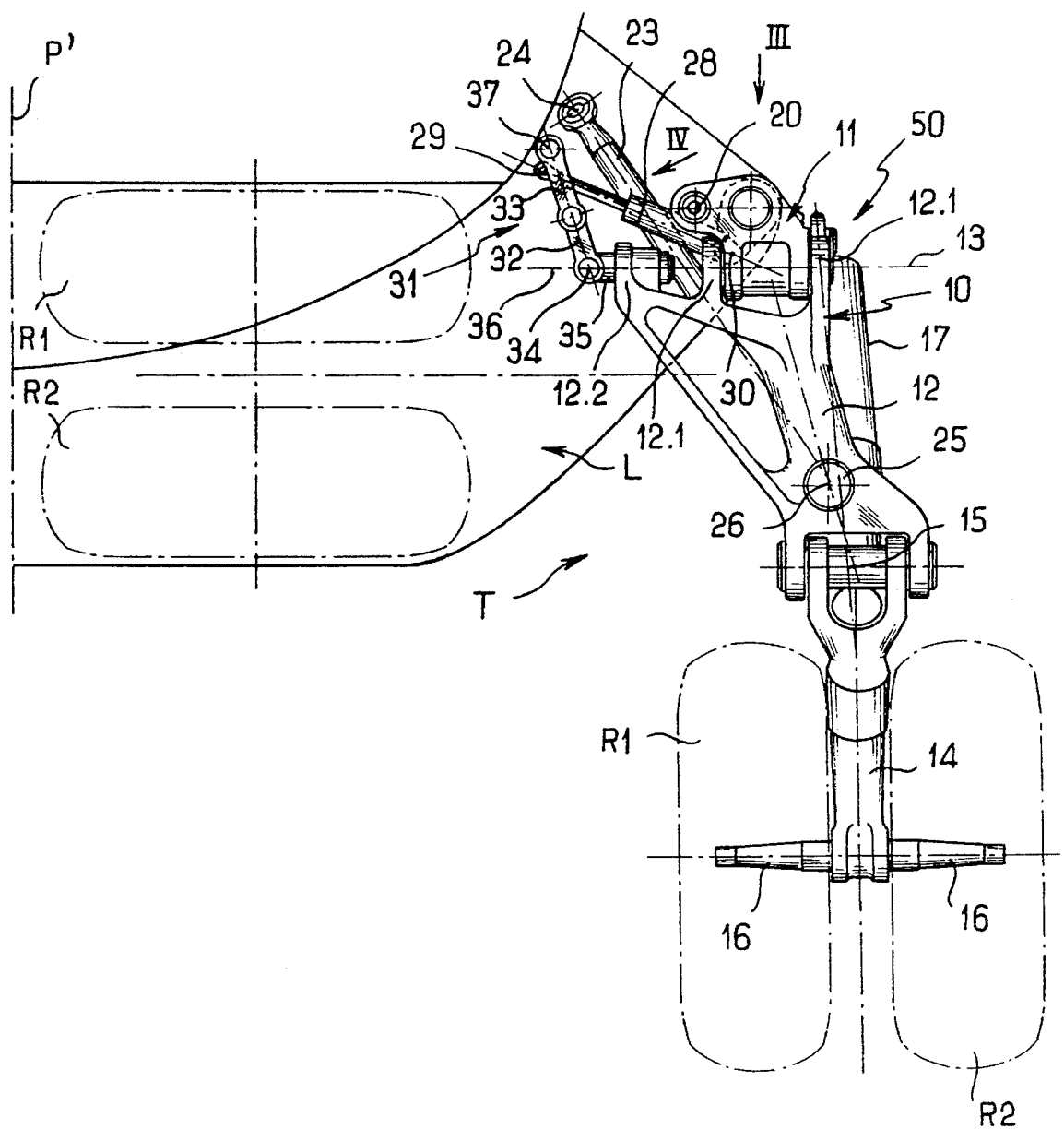
FIG_1

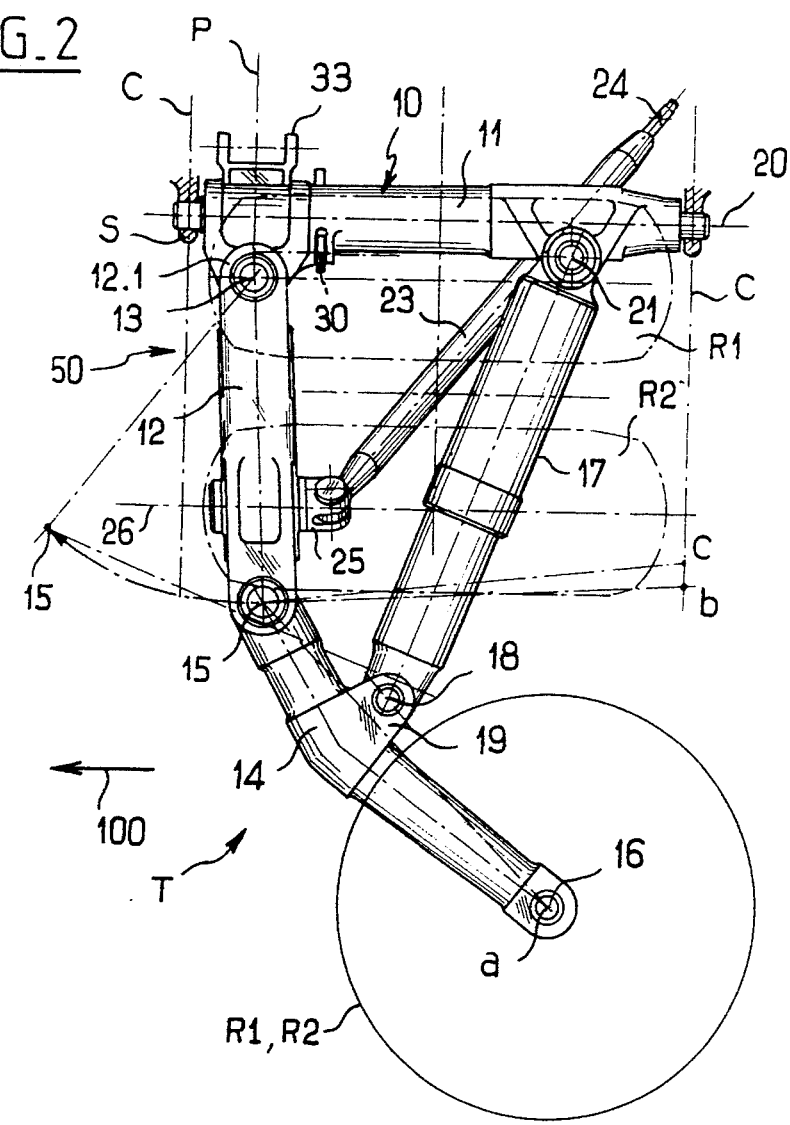
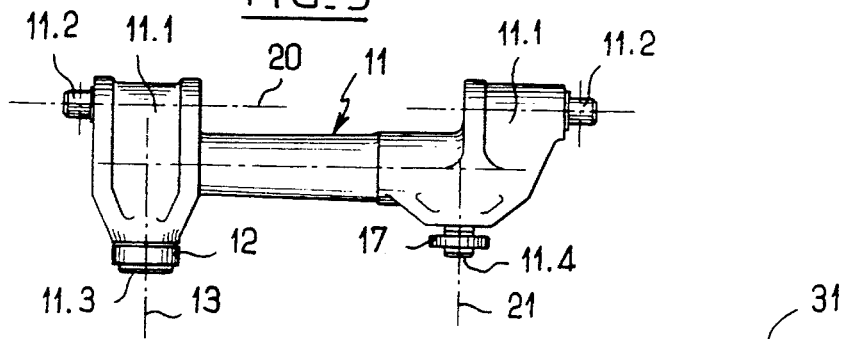
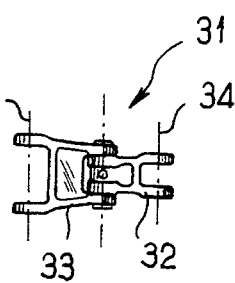

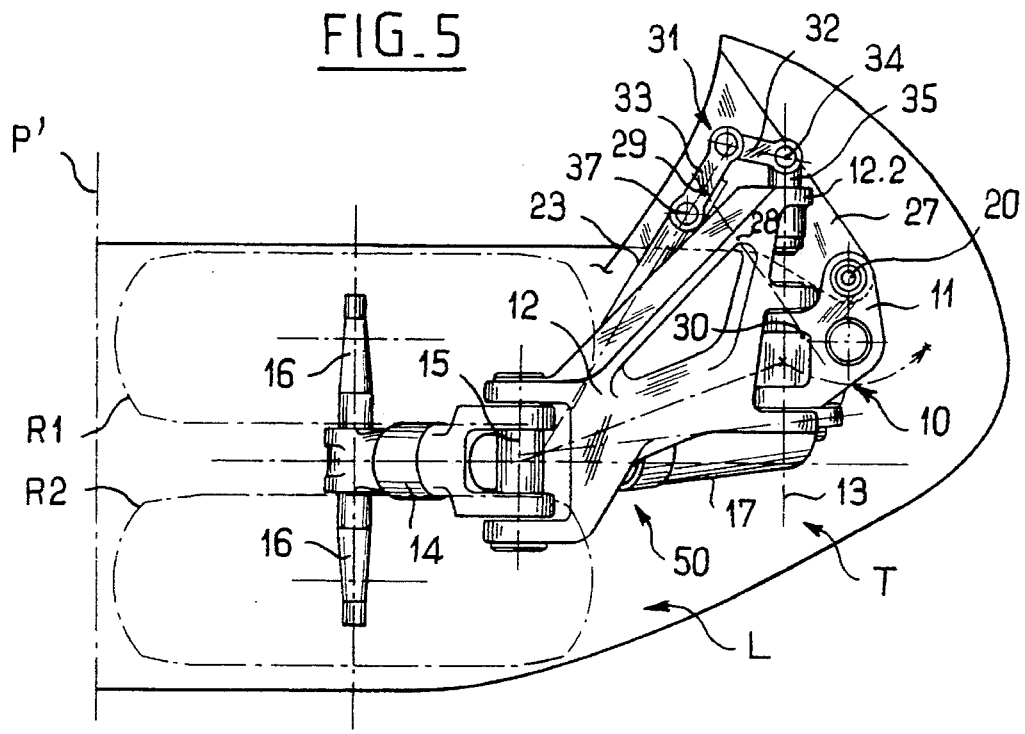
FIG_5
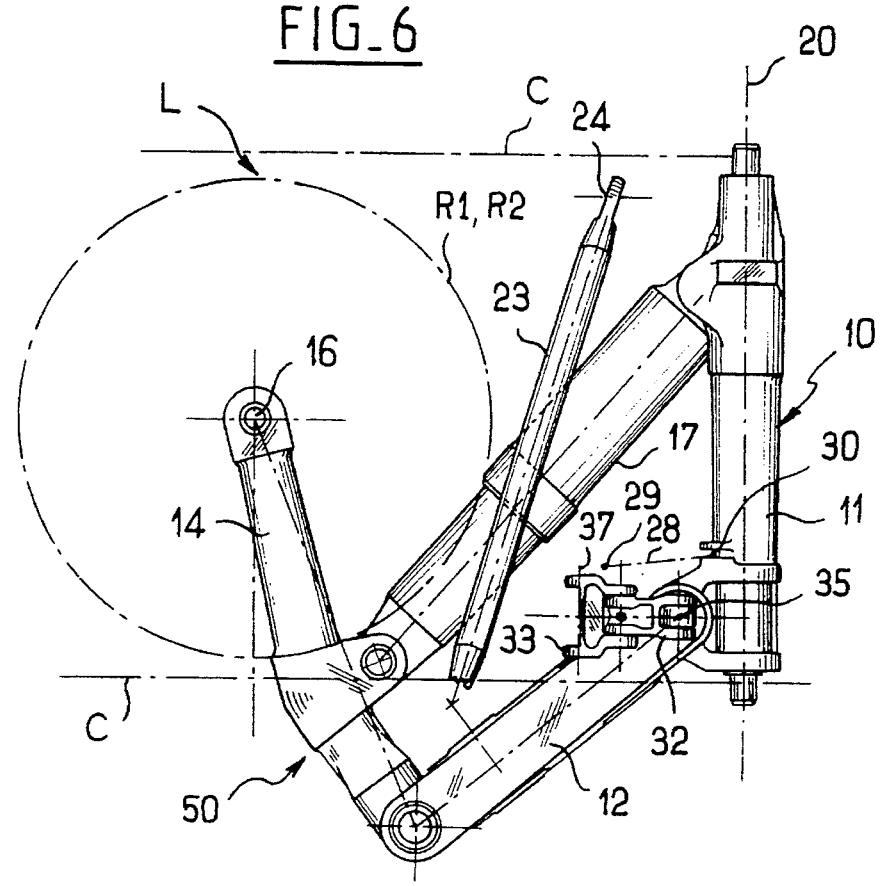
FIG_6

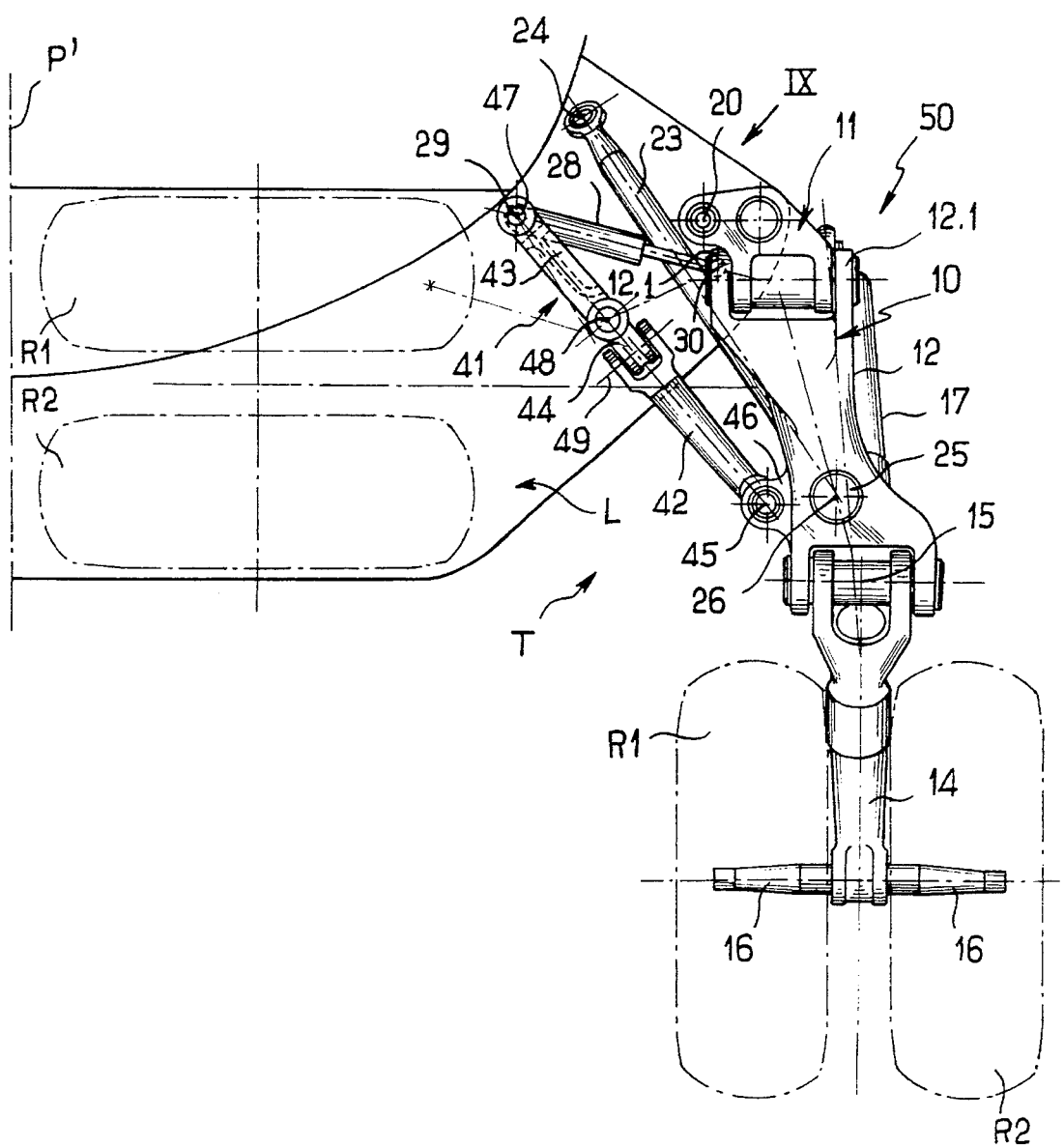
FIG_7

FIG_8
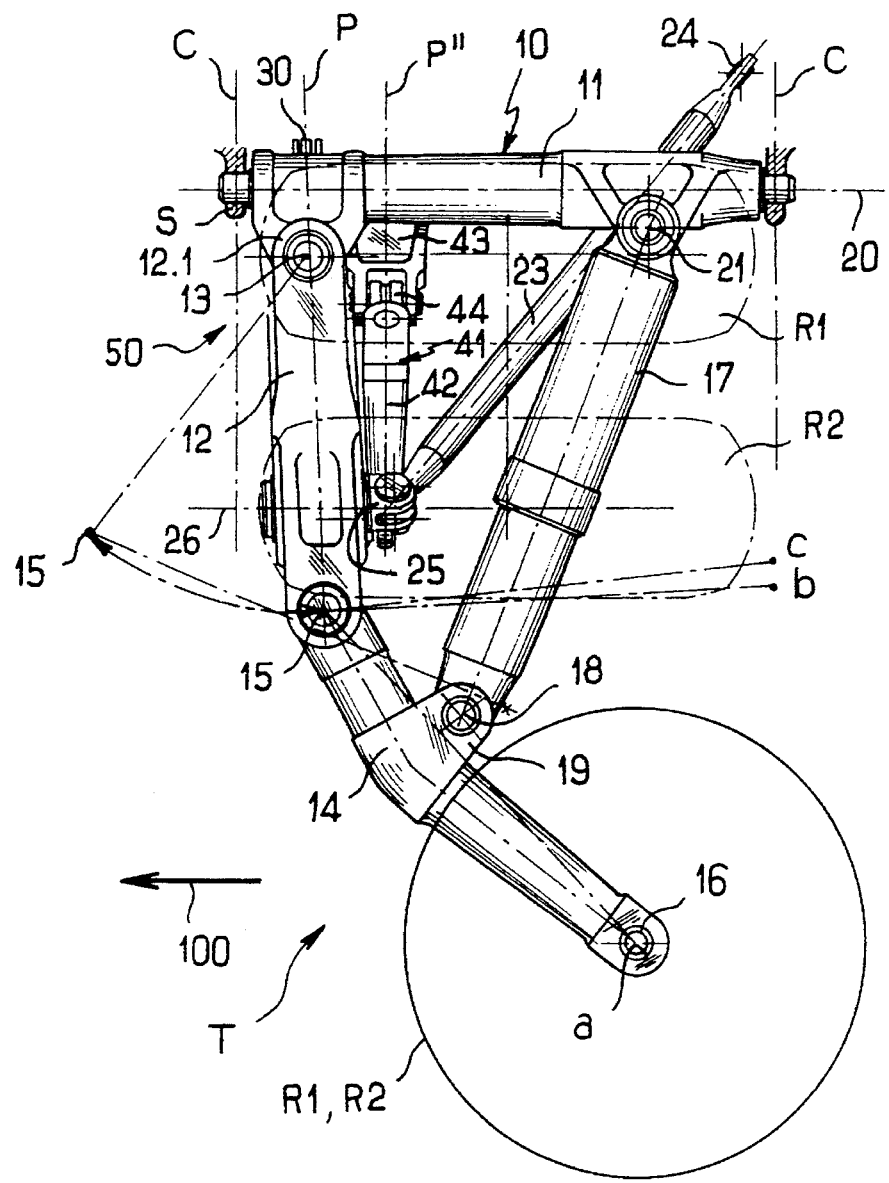
FIG_9
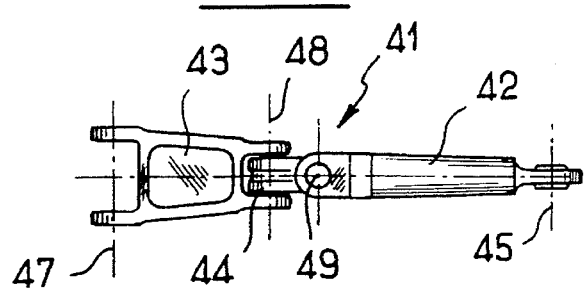

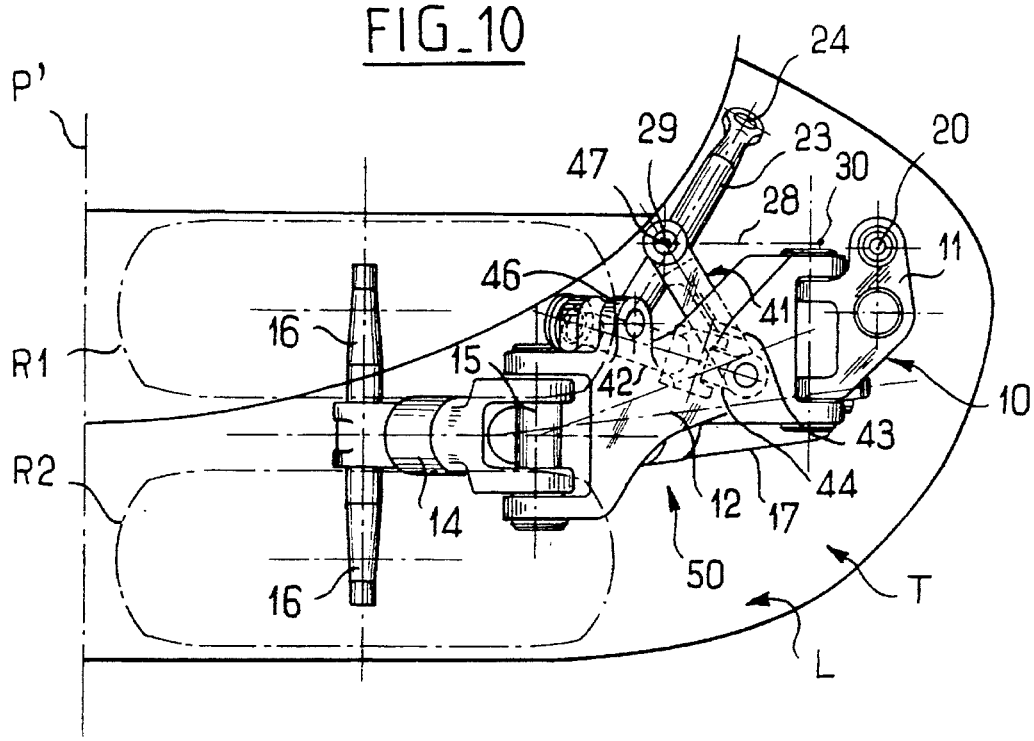
FIG_10
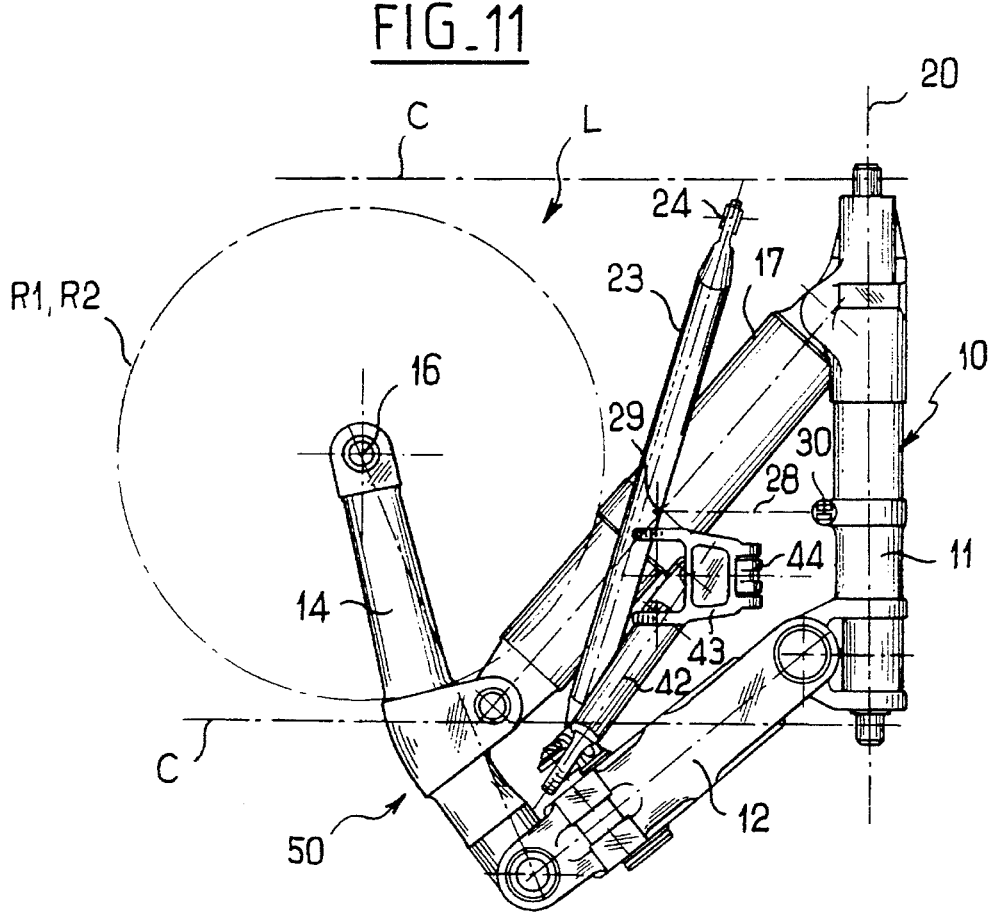
FIG_11

LATERALLY-RAISABLE AIRCRAFT LANDING GEAR

The invention relates to aircraft landing gear of the laterally-raising type, comprising a leg hinged to a structure of the aircraft and fitted at its bottom end with a wheel set, the leg also being fitted with a driving actuator that serves to pivot the leg about its hinge axis.

BACKGROUND OF THE INVENTION

Such fuselage landing gears are known in which the leg is constituted by an upside-down L-shaped rigid strut, with a wheel lever hinged to the bottom end thereof, extending rearwards, and carrying a single wheel, or more commonly a pair of side-by-side wheels. The rigid strut is hinged to the aircraft structure by a branch that is horizontal or slightly inclined, and a shock absorber connects said branch to the wheel lever.

Under such circumstances, the length of the landing gear is essentially the same in the landing gear retracted position and in the landing gear extended position (before the wheels make contact with the ground): if the hinge axis of the rigid strut is inclined relative to the structure of the aircraft, then the wheel is indeed advanced a little when the landing gear is raised, but the advance remains very small.

It may be advantageous to seek landing gear of a structure enabling it to be long on landing, but short during taxiing and also when in the retracted position, thereby avoiding excessive sideways dimensions of the associated fairing on the aircraft, and possibly also avoiding the need to modify existing frames, thereby making it possible to provide aircraft that have been modified to accept greater loads, and consequently needing to be fitted with tires of larger dimensions, while still retaining the same fuselage structure.

Unfortunately, landing gear fitted with apparatus for shortening the leg thereof while it is being raised are generally complex and bulky in structure.

The state of the art may be rounded off by mentioning documents EP-A-0 031 601 and FR-A-1 245 515, which show solutions implemented in three portions, with a horizontal portion hinged to the structure of the airplane, a vertical portion hinged to said horizontal portion, and a structural bar to brace the vertical portion (said bar also serving as a guide bar while the landing gear is being raised).

OBJECTS AND SUMMARY OF THE INVENTION

A particular aim of the invention is to solve this problem by designing landing gear in which the structure makes it possible, while the gear is being raised, to fold in and advance the wheel or the two wheels (side-by-side twin wheels), in order to obtain as much compactness as possible when the landing gear is folded-in, and an optimum disposition relative to the structure.

An object of the invention is also to provide landing gear of a structure that enables its geometry to be varied during raising in a manner that is both accurate and reliable, and is also without sequencing.

More particularly, the present invention provides an aircraft landing gear of the type that is raised laterally, comprising a leg hinged to the structure of an aircraft and fitted at its bottom end with a wheel set, together with a driving actuator for pivoting said leg about its hinge axis, wherein:

the leg is in the form of an upside-down L-shaped strut whose two branches are hinged to each other, comprising a beam-forming first branch which is hinged to the structure of the aircraft, and a second branch having a wheel lever hinged to the end thereof about an axis which, when the landing gear is down, extends substantially perpendicular to the longitudinal midplane of the aircraft;

the wheel lever is connected to the first branch of the hinged strut by a shock absorber which is hinged to said wheel lever at a point situated between the hinged axis of said wheel lever and the wheel axle it carries; and a controlling guide bar also connects the second branch of the hinged strut to the structure of the aircraft via a fork swivel-mounted on this branch, said bar being disposed to move said second branch forwards while the landing gear is being raised, this forwards movement causing the wheels to be folded in due to the fact that the shock absorber then acts as a second guide bar.

Preferably, the controlling guide bar is disposed behind the second branch of the hinged strut so as to push said branch while the landing gear is being raised and while simultaneously folding in the wheels. It would naturally be possible to provide a disposition in front of the second branch, but that solution would take up considerable space longitudinally.

It is then advantageous for the swivelling fork to which the controlling guide bar is connected to be disposed in the vicinity of the end of the second branch of the hinged strut.

It is also advantageous, particularly for large airplanes, to provide cross-bracing means associated with the leg of the landing gear.

In a first embodiment, the landing gear then includes a small hinged side brace whose two arms lie in a transverse plane that includes the hinge axis between the two branches of the hinged strut, with this being true in all angular positions of said strut. Advantageously, said small side brace includes a first arm hinged to the structure of the aircraft, and a second arm hinged to a swivel mounted on an appendix on the second branch of the hinge strut, with the axis of said swivel coinciding with the hinge axis between the two branches of said strut.

In another variant, the landing gear includes a hinged side brace whose two arms can also pivot relative to each other by means of a universal joint provided at their hinge. It may then be advantageous for said side brace to include a first arm hinged to the structure of the aircraft, and a second arm hinged to a lug disposed near the bottom of the second branch of the hinged strut, said side brace also being organized in such a manner that its two arms in the landing gear down position lie in a transverse plane that is behind the transverse plane that includes the hinge axis between the two branches of said strut.

BRIEF DESCRIPTION OF THE DRAWINGS

Other characteristics and advantages of the invention appear more clearly in the light of the following description and the accompanying drawings that relate to a particular embodiment, described with reference to the figures, in which:

FIGS. 1 and 2 are respectively a front view and a side view of hinged strut landing gear of the invention in the landing gear down position (the up position is merely sketched by the wheels being shown in chain-dotted lines), said landing gear including, in this case, a small side brace for cross-bracing purposes;

FIGS. 3 and 4 are fragmentary views as seen along arrows III and IV in FIG. 1, respectively showing the particular disposition of the first branch forming the beam of the hinged strut, and of the two arms of the small side brace;

FIG. 5 is a front view of the above landing gear in the up (retracted) position;

FIG. 6 is a plan view showing the landing gear that is symmetrical to the above landing gear, in the up (retracted) position;

FIGS. 7 and 8 should be compared with FIGS. 1 and 2, and they show a variant fitted with different cross-bracing means (a side brace having a universal joint at its hinge), the undercarriage being shown in the down position;

FIG. 9 is a fragmentary view seen along arrow IX of FIG. 7, showing the above-mentioned side brace and its universal joint; and FIGS. 10 and 11 should be compared with FIGS. 5 and 6, and show said other landing gear in its high (retracted) position.

MORE DETAILED DESCRIPTION

Landing gear T of the invention is described below with reference to FIGS. 1 to 6, said landing gear being of the laterally-raisable type, and being received in the up position in an associated housing L of the structure of the aircraft concerned, which housing is defined by two transverse webs C that are represented diagrammatically herein by chain-dotted lines in FIGS. 2 and 6.

The landing gear T includes a leg 50 hinged to an aircraft structure S and fitted at its bottom end with a set of wheels R1 and R2, also being fitted with a driving actuator 28 (visible in FIG. 1 but merely sketched in chain-dotted lines in FIGS. 5 and 6) for pivoting said leg about its hinge axis. The driving actuator 28 has its rod secured at 29 to the structure of the airplane, and has its cylinder secured at 30 to a lug on the first branch 11 of the hinged strut 10. In FIG. 2, the forward direction is indicated by arrow 100.

The leg 50 is formed by an upside-down L-shaped strut 10 whose two branches 11 and 12 are hinged to each other about an axis 13. The strut is thus hinged, unlike the rigid upside-down L-shaped struts of known landing gear. The hinged strut 10 thus includes a first branch 11 that forms a beam which is hinged to the structure of the aircraft S via end trunnions 11.2, with the associated hinge axis being referenced 20. The second branch 12 of the hinged strut 10 has two lugs 12.1 at its top end which are associated with one end of the beam-forming branch 11 about the above-mentioned hinge axis 13. The free end of the branch 12 carries a wheel lever 14 having one end hinged at 15 to the end of the branch 12 while its other end carries a wheel axle 16 which is associated in this case with a twin set of wheels R1, R2, i.e. two wheels on either side of the midplane of the wheel lever. The wheel lever 14 can thus pivot about the axis 15 which axis is substantially perpendicular to the longitudinal midplane P' of the aircraft when the landing gear is down.

The wheel lever 14 is also connected to the first branch 11 of the hinged strut 10 by a shock absorber 17. To this end, the wheel lever 14 has a lug 19 to which the end of the rod of the shock absorber 17 is hinged at 18, the body of said shock absorber being hinged at 21 to the first branch 11 of the hinged strut 10. FIG. 3 shows more clearly the special shape of said first branch 11 of the hinged strut 10, showing its two ends 11.1 each of which has a hinge trunnion 11.2 corresponding to the pivot axis 20 of the leg. One end of the beam-forming branch 11 has an outwardly-extending first trunnion 11.3 associated with the lug 12.1 of the second branch 12 of the hinged strut, while the other end of said beam-forming branch has an outwardly extending trunnion 11.4 corresponding to the connection with the shock absorber 17. In practice, the beam-forming first branch 11 of the hinged strut 10 is mounted on an appendix 27 of the structure of the aircraft which appendix is shown in FIG. 5 only.

The landing gear T of the invention also includes a controlling guide bar 23 secured at 24 to the structure of the aircraft and at its opposite end to a fork 25 which is swivel-mounted to the second branch 12 of the hinged strut 10. Reference 26 designates the swivel axis of the fork 25, said fork thus constituting part of a universal joint whose axes intersect.

The combination of the hinge 13 between the two branches 11 and 12 of the hinged strut 10 and of the controlling guide bar 23 has the effect, while the landing gear is being raised, of urging the wheel lever 14 towards the front: the shock absorber then acts as a second guide bar and as a result, while the wheels are being raised, the wheel lever and thus the wheels themselves are moved forwards in synchronous manner. This combination of movements is positively driven so that while the landing gear is being raised, its shape varies in a manner that is both accurate and reliable, thereby ensuring that the wheels take up position accurately between the corresponding webs or frame members C, as can be seen in FIG. 6.

In the present case, the controlling guide bar 23 is disposed behind the second branch 12 of the hinged strut 10 so as to push said branch while the landing gear is being raised and the wheels are being retracted. Such a configuration makes it possible to concentrate the connection points between the two webs or frames C, thereby ensuring optimum compactness. Naturally, it is possible to envisage a different disposition using a controlling guide bar disposed in front of the hinged second branch of the strut: under such circumstances, the bar would exert traction on the second branch of the strut while the landing gear is being raised. Nevertheless, such a variant would have the effect of considerably increasing overall longitudinal size of the landing ger.

The swivelling fork 25 to which the controlling guide bar 23 is connected is preferably disposed close to the bottom end of the second branch 12 of the hinged strut 10 so as to exert optimum thrust force on said second branch while the landing gear is being raised. In addition, the guide bar 23 serves to take up longitudinal forces exerted on the strut when the landing gear is down.

In FIG. 2, the landing gear of the invention is shown in the down position, with its shock absorber fully extended. The wheel axle 16 is then level with a point a. This figure also shows points b and c which correspond respectively to the position of the wheel axle under static loading, and to its position under maximum compression of the shock absorber 17. This figure also shows how the second branch 12 of the hinged strut pivots while the landing gear is being raised, thereby demonstrating how far the wheel lever 14 is moved forwards during that movement. As can readily be understood, such an advance could not be obtained merely by inclining the hinge axis of the upside-down L-shaped rigid strut in the manner of the prior art.

The invention also seeks to solve another problem which is that of cross-bracing, since cross-bracing means are often provided in association with a raisable landing gear leg designed for a large airplane. However, because the strut of the leg is hinged, the installation of cross-bracing means is made somewhat more complicated. Two solutions to this problem are described below, both naturally being given by way of example only.

In a first embodiment, the landing gear includes a small hinged side brace 31 made up of two arms 32 and 33 which lie in a transverse plane P that includes the hinge axis 13 between the two branches 11 and 12 of the hinge strut 10, with this remaining true in all angular positions of said strut. In particular, the small side brace 31 includes a first arm 33 which is hinged at 37 to the structure of the aircraft, and a second arm 32 which is hinged at 34 to a swivel 35 mounted on a rear lug 12.2 on the second branch 12 of the hinged strut 10. In this case, the swivel axis 36 of the swivel 35 coincides with the hinge axis 13 between the two branches 11 and 12 of the hinged strut 10. This disposition ensures that there is no need for play or a ball-and-socket type joint in the side brace to enable it to accommodate pivoting of the landing gear leg.

The fact that the two arms 32 and 33 of the small hinged side brace 31 remain in the above-mentioned transverse plane P means that when the landing gear is down the second branch 12 of the hinged strut 10 itself participates in the cross-bracing, in the manner of a side brace "third arm". The fragmentary view of FIG. 4 shows the structure of said small side brace 31 more clearly.

With reference to FIGS. 7 to 11, there follows a description of a second embodiment of the hinged strut landing gear of the invention, said landing gear differing from the gear described above only in the cross-bracing means used. As a result, items that are common to both embodiments are given the same references, and they are not specifically described again. As before, the driving actuator 28 secured at 29 to the structure of the airplane and at 30 to a lug on the first branch 11 of the hinged strut 10 is visible in FIG. 7, but is represented merely as a chain-dotted axis in FIGS. 10 and 11.

Instead of securing one arm of the small side brace to the top portion of the second branch of the hinged strut, at a swivel that is disposed on the same axis as the hinge axis between the two branches of said hinge strut, a hinged side brace 41 is now provided in which the two arms 42 and 43 are also capable of pivoting relative to each other by means of a universal joint 44 where they are connected together.

Thus, there is a first arm 43 which is hinged at 47 to the structure of the aircraft, and a second arm 42 which is hinged to an appendix 46 disposed at the bottom of the second branch 12 of the hinged strut 10. References 48 and 49 designate the two orthogonal axes of the universal joint 44, respectively associated with the first arm 43 and with the second arm 42 of said side brace. The disposition of the side brace 41 will be understood better on referring to the fragmentary view of FIG. 9.

As can be seen in FIGS. 7 to 9, the side brace 41 is also disposed in such that its two arms 42 and 43 lie, when the landing gear is down, in a transverse plane P" that lies behind the transverse plane P which includes the hinge axis 13 between the two branches 11 and 12 of the hinged strut 10. The landing gear is thus still compact, in spite of the slightly more complicated structure of its side brace that includes a universal joint.

As will easily be understood, the presence of the universal joint 44 enables the second branch 12 of the hinged strut 10 to follow the forward movement of the wheel lever while the landing gear is being raised, which would not have been possible with a side brace of traditional type having no freedom to pivot transversely at its hinge.

Landing gear has thus been implemented having a structure that makes it possible, while the landing gear is being raised, to fold in and move forwards the wheel or the twin wheels in such a manner as to obtain optimum compactness when the landing gear is received inside the aircraft. In addition, the structure of the landing gear remains simple, and it enables its geometry to be varied during raising in a manner that is both accurate and reliable.

The invention is not limited to the embodiments described above, but on the contrary extends to any variant that may use equivalent means to reproduce the essential characteristics specified above.

We claim:

1. Aircraft landing gear capable of being raised laterally, comprising a leg hinged to the structure of an aircraft and fitted at its bottom end with a wheel set, together with a driving actuator for pivoting said leg about its hinge axis, wherein:

the leg includes an upside-down L-shaped strut whose two branches are hinged to each other, comprising a beam-forming first branch which is hinged to the structure of the aircraft, and a second branch having a wheel lever hinged to the end thereof about an axis which, when the landing gear is down, extends substantially perpendicular to the longitudinal midplane of the aircraft;

the wheel lever is connected to the first branch of the hinged strut by a shock absorber which is hinged to said wheel lever at a point situated between the hinged axis of said wheel lever and the wheel axle it carries; and a controlling guide bar having a constant length also connects the second branch of the hinged strut to the structure of the aircraft, via a fork swivel-mounted on this branch, said bar being disposed to move said second branch forwards while the landing gear is being raised, this forwards movement causing the wheels to be folded in due to the fact that the shock absorber then acts as a second guide bar.

2. Landing gear according to claim 1, wherein the controlling guide bar is disposed behind the second branch of the hinged strut so as to push said branch while the landing gear is being raised and while simultaneously folding in the wheels.

3. Landing gear according to claim 2, wherein the swivelling fork to which the controlling guide bar is connected is disposed in the vicinity of the end of the second branch of the hinged strut.

4. Landing gear according to claim 1, in which cross-brace means are associated with the leg of the landing gear, including a small hinged side brace whose two arms lie in a transverse plane that includes the hinge axis between the two branches of the hinged strut, with this being true in all angular positions of said strut.

5. Landing gear according to claim 4, wherein the small side brace includes a first arm hinged to the structure of the aircraft, and a second arm hinged to a swivel mounted on an appendix on the second branch of the hinge strut, with the axis of said swivel coinciding with the hinge axis between the two branches of said strut.

6. Landing gear according to claim 1, in which cross-brace means are associated with the leg of the landing gear, including a hinged side brace whose two arms can also pivot relative to each other by means of a universal joint provided at their hinge.

7. Landing gear according to claim 6, wherein the side brace includes a first arm hinged to the structure of the aircraft, and a second arm hinged to a lug disposed near the bottom of the second branch of the hinged strut, said side brace also being organized in such a manner that its two arms in the landing gear down position lie in a transverse plane that is behind the transverse plane that includes the hinge axis between the two branches of said strut.

* * * * *